United States Patent [19]

Sunano et al.

[11] Patent Number: 4,465,795

[45] Date of Patent: Aug. 14, 1984

[54] ANTIFOULING COATING COMPOSITION

[75] Inventors: Katsuaki Sunano, Nagoya; Yukio Matsuda, Ohtake, both of Japan

[73] Assignee: Mitsubishi Rayon Co., Ltd., Tokyo, Japan

[21] Appl. No.: 454,707

[22] Filed: Dec. 30, 1982

[30] Foreign Application Priority Data

Jan. 12, 1982 [JP] Japan .................................. 57-3076

[51] Int. Cl.$^3$ ...................... C08L 33/08; C08L 33/10
[52] U.S. Cl. .................................... 523/122; 523/177; 106/15.05; 424/288
[58] Field of Search .............................. 523/122, 177; 106/15.05; 424/288

[56] References Cited

U.S. PATENT DOCUMENTS 4,262,097  4/1981  Dawans ...................... 106/15.05 X

FOREIGN PATENT DOCUMENTS 2750860  5/1978  Fed. Rep. of Germany ...... 523/122
198762  12/1982  Japan .................................. 523/122

*Primary Examiner*—John Kight, III
*Assistant Examiner*—Garnette D. Draper
*Attorney, Agent, or Firm*—Oblon, Fisher, Spivak, McClelland & Maier

[57] ABSTRACT

An antifouling coating composition having excellent antifouling performance and coating film performances comprising a vehicle, an antifouling agent and optionally other additives characterized by containing, as at least a part of said vehicle, a polymer constituted of at least one monomer represented by the following general formula:

$$CH_2=\overset{R}{\underset{|}{C}}-COOR' \qquad (I)$$

wherein R is hydrogen or methyl group and R' is hydrogen or alkyl group having 1-12 carbon atoms, or of said at least one monomer and other vinyl monomer copolymerizable therewith, having a glass transition temperature of −30° C. to 0° C. and having a weight average molecular weight falling in the range of 20,000–200,000.

10 Claims, No Drawings

ANTIFOULING COATING COMPOSITION

This invention relates to an antifouling coating composition which exhibits a high antifouling performance and excellent coating performances when formed into an antifouling coating film by using a specified vehicle together with a known antifouling agent such as a copper compound (cuprous oxide, copper rhodanate and the like), a sulfur compound (zinc dimethylthiocarbamate, tetramethylthiuram disulfide and the like) or a tin compound ((triphenyltin hydroxide, tributyltin oxide and the like) and other additives such as coloring pigment, extender pigment, pigment dispersant, antifoaming agent, levelling agent and plasticizer.

Undersea constructions, piers, buoys, harbor facilities, fishing-nets, ships and the like, which are while being immersed in sea water for a long period of time suffer various damage due to the attachment of marine organisms. In the case of ships, for example, such attachment of marine organisms increases the frictional resistance between the ship's body and sea water which results in a drop in speed and an increased consumption of fuel. In the case of plants using sea water as cooling water, induction of sea water into cooling pipes is hindered which results in a drop in cooling efficiency. In the case of fishing-nets and particularly fishing-nets for fish farming, the through passage of sea water is hindered which results in oxygen starvation of the cultured fish and their growth is retarded.

With the aim of preventing such attachment of marine organisms, there have hitherto been developed the insoluble matrix types of antifouling coating materials using chlorinated rubber, vinyl chloride resin or the like as a vehicle and soluble matrix types of antifouling coating materials using high-polymeric organotin compound such as tributyltin methacrylate or the like as a vehicle. And antifouling coating materials having unique antifouling performance are commercialized depending on the kind and amount of such antifouling agent as mentioned above. However, when used as a ship bottom antifouling paint, the former is undesirable in that, after the dissolution of the antifouling agent into sea water, the surface of coated film becomes porous to increase the frictional resistance between the sea water and the ship body. On the other hand, in the case of the latter, the coated film also dissolves and diffuses into the sea water simultaneously with the dissolution of antifouling agent and the surface of the coated film is smoothed by the grinding action of the sea water, so that the frictional resistance between the sea water and the ship's body does not increase. However, due to the hydrolyzability of the high-polymeric organotin compound used as a vehicle by sea water, the coated film undergoes cracking, breaking and peeling upon exposure to strong ultraviolet rays at sea, particularly in the neighborhood of the water line.

An antifouling coating has now been found with which the frictional resistance between sea water and the ship's body can be decreased. The surface of the coated film, is prevented after dissolution of antifouling agent into sea water, from the phenomenon of becoming porous which is a problem with conventional insoluble matrix type of antifouling coating materials and the surface of the film is kept smooth to at least the same extent as in the soluble matrix type of antifouling coating materials. At the same time the cracking, breaking and peeling of coated film upon exposure to ultraviolet rays which is the fault of soluble matrix type of antifouling coating materials can be overcome.

This invention provides an antifouling coating composition comprising a vehicle, an antifouling agent and optionally other additives characterized in that at least a part of said vehicle is polymer (A) constituted of at least one monomer represented by the following general formula:

wherein R is hydrogen or methyl group and R' is hydrogen or alkyl group having 1–12 carbon atoms, having a glass transition temperature of −30° C. to 0° C. and preferably −20° C. to −10° C. and having a weight average molecular weight of 20,000–200,000 and preferably 50,000–100,000, or at least a part of said vehicle is polymer (A') constituted of at least one monomer represented by the following general formula:

wherein R is hydrogen or methyl group and R' is hydrogen or alkyl group having 1–12 carbon atoms, and other vinyl monomer copolymerizable therewith, having a glass transition temperature of −30° C. to 0° C. and preferably −20° C. to −10° C. and having a weight average molecular weight of 20,000–200,000 and preferably 50,000–100,000.

As the monomer represented by the abovementioned general formula (I), any monomers can be used in this invention, so far as polymer constituted thereof has a glass transition temperature and a weight average molecular weight defined above. Among them, however, preferable are acrylic esters such as ethyl acrylate and butyl acrylate and methacrylic esters such as methyl methacrylate and ethyl methacrylate. As said vinyl monomer copolymerizable therewith, methacrylic acid derivatives such as 2-hydroxyethyl methacrylate and dimethylaminoethyl methacrylate are preferable. Styrene may also be employed.

The ratio of said compound represented by general formula (I):

to said other vinyl monomer copolymerizable therewith, constituting the above-mentioned polymer (A'), is in the range of 100–80% by weight of the former per 0–20% by weight of the latter, and preferably 100–90% by weight of the former per 0–10% by weight of the latter. Most preferably, the ratio of the latter monomer is up to 7% by weight.

Though the vehicle of this invention may be constituted of polymer (A) or (A') only, it may also be a mixture which known vehicles such as chlorinated rubber, vinyl chloride resin and the like.

By adjusting the glass transition temperature ($T_g$) (as referred to in this invention, $T_g$ is a value calculated from the following empirical equation: $1/T_g = \Sigma W_n/T_{gn}$, wherein $T_g$ is the glass transition temperature (absolute temperature) of polymer (A), $W_n$ is weight fraction of n monomer and $T_{gn}$ is the glass transition temperature (absolute temperature) of the homopolymer of n monomer) of polymer (A) and polymer (A') to −30° C. to 0° C., or a temperature generally lower than sea water temperature throughout one year, the coating film itself after dissolution of the antifouling agent, which is considered to become porous temporarily, becomes able to readily undergo a deformation along the flow of sea water owing to the resistance between ship body and sea water and thereby to acquire a smoothness at least comparable to the smoothness of the coating film just after being coated. If $T_g$ is adjusted to a temperature higher than 0° C., the resulting coating film is inferior in smoothness and antifouling performance. If it is adjusted to a temperature lower than −30° C., the resulting coating film is impractically inferior in tack and strength.

If weight average molecular weight, measured by high speed liquid chromatography (GPC), of polymer (A) is adjusted to 20,000–200,000, smoothness of coating film is heightened, and it becomes possible to obtain a coating film excellent in weather resistance to ultraviolet rays in the neighborhood of water line and free from cracking, breaking and peeling. Adjustment of the weight average molecular weight to a value smaller than 20,000 or a value greater than 200,000 is both impractical in point of strength of coating film in the former case and in point of coating workability in the latter case.

Next, this invention will be illustrated more concretely with reference to the following examples and comparative examples which are not presented in any way as limitative way.

EXAMPLE 1

Into a flask equipped with a reflux condenser, a thermometer, a stirrer and a monomer dropping device was charged 1,200 g of xylene. While keeping the inner temperature of the flask at 90°–100° C., a mixed solution consisting of 400 g of ethyl methacrylate, 100 g of 2-hydroxyethyl methacrylate, 1,500 g of ethyl acrylate and 3 g of benzoyl peroxide was dropped thereinto over a period of 4 hours. After the mixture had been completely dropped, into the flask each 5 g of benzoyl peroxide was added three times (total 15 g) at a time interval of 2 hours to complete the polymerization reaction, while keeping the inner temperature of the flask still at 90°–100° C. Then, the flask was cooled to an ambient temperature and 800 g of xylene was added. Thus, there has obtained a solution of a resin having a weight average molecular weight of 60,000 and $T_g$ of −2° C.

To 400 g of the above-mentioned resin solution were added 250 g of cuprous oxide, 70 g of triphenyltin hydroxide, 30 g of red iron oxide, 30 g of zinc white, 10 g of pigment dispersant and 210 g of xylene, and the resulting mixture was kneaded by means of a ball mill to prepare an antifouling coating material. The antifouling coating material was coated on an iron plate, previously coated with vinyl type ship bottom paint No. 1, twice by means of a brush so as to give a coating weight of 200 g/m², after which it was dried for 24 hours to prepare a test piece. When the test piece was immersed in sea water for one year at the sea of Otake City, Hiroshima Prefecture, Japan, no fouling was detected at all and the surface of the coating film remained smooth. Further, a part of the test piece was kept in the same state as at the water line of ships. No cracking, breaking nor peeling of coating film use observed.

EXAMPLE 2

The same apparatus as in Example 1 was used. After charging 1,200 g of xylene into the flask, a mixed solution consisting of 360 g of methyl methacrylate, 40 g of dimethylaminoethyl methacrylate, 1,600 g of ethyl acrylate and 3 g of benzoyl peroxide was dropped into the flask over a period of 4 hours while keeping the inner temperature of the flask at 90°–100° C. After the mixture had been completely dropped into the flask, each 5 g of benzoyl peroxide was added three times (total 15 g) at a time interval of 2 hours to complete the polymerization reaction, while keeping the inner temperature of the flask at 90°–100° C. Then, the flask was cooled to an ambient temperature and 800 g of xylene was added. Thus, there was obtained a solution of a resin having a weight average molecular weight of 65,000 and $T_g$ of −2° C.

Using the solution of resin obtained above as a vehicle, an antifouling coating was prepared in the same manner as in Example 1 and immersion testing was conducted in the same manner as in Example 1.

EXAMPLE 3

The same apparatus as in Example 1 as used. After charging 1,200 g of xylene into the flask, a mixed solution consisting of 400 g of ethyl methacrylate, 100 g of 2-hydroxyethyl methacrylate, 1,500 g of ethyl acrylate and 3 g of benzoyl peroxide was dropped into the flask over a period of 4 hours, while keeping the inner temperature of the flask at 90°–100° C. After the mixture had been completely dropped, into the flask, each 5 g of benzoyl peroxide was added three times (total 15 g) at a time interval of 2 hours to complete the polymerization reaction, while keeping the inner temperature of the flask still at 90°–100° C. Then, the flask was cooled to the ambient temperature and 600 g of xylene was added. Thus, there was obtained a solution of a resin having a weight average molecular weight of 45,000 and $T_g$ of −2° C.

Using the solution of resin obtained above as a vehicle, an antifouling coating was prepared in the same manner as in Example 1 and immersion testing was conducted in the same manner as in Example 1.

EXAMPLE 4

The same apparatus as in Example 1 was used. After charging 1,200 g of xylene into the flask, a mixed solution consisting of 1,500 g of methyl methacrylate, 500 g of butyl acrylate and 3 g of benzoyl peroxide was dropped into the flask over a period of 4 hours, while keeping inner temperature of the flask at 90°–100° C. After the mixture had been completely dropped into the flask, each 5 g of benzoyl peroxide was added at a time interval of 2 hours to complete the polymerization reaction, while keeping the inner temperature of the flask still at 90°–100° C. Then the flask was cooled, and 800 g of xylene was added. Thus, there was obtained a solution of a resin having a weight average molecular weight of 75,000 and $T_g$ of −20° C.

Using the solution of resin obtained above as a vehicle, an antifouling coating was prepared in the same manner as in Example 1 and immersion testing was conducted in the same manner as in Example 1.

EXAMPLE 5

The same apparatus as in Example 1 was used. After charging 1,200 g of xylene into the flask, a mixed solution consisting of 360 g of methyl methacrylate, 40 g of dimethylaminoethyl methacrylate, 1,600 g of ethyl acrylate and 31 g of benzoyl peroxide was dropped thereinto over a period of 4 hours, while keeping the inner temperature of the flask at 90°–100° C. After the mixture had been completely dropped, into the flask each 5 g of benzoyl peroxide were added three times (total 15 g) at a time interval of 2 hours, while keeping the inner temperature of the flask at 90°–100° C., to complete the polymerization reaction. Then, the flask was cooled to an ambient temperature, and 800 g of xylene was added. Thus, there was obtained a solution of a resin having a weight average molecular weight of 65,000 and $T_g$ of $-2°$ C.

Using the solution of resin obtained above as a vehicle, an antifouling coating was prepared in the same manner as in Example 1 and immersion testing was conducted in the same manner as in Example 1.

COMPARATIVE EXAMPLE 1

The same apparatus as in Example 1 was used. After charging 1,200 g of xylene into the flask, a mixed solution consisting of 800 g of methyl methacrylate, 1,000 g of butyl acrylate, 200 g of styrene and 10 g of benzoyl peroxide was dropped thereinto over a period of 4 hours, while keeping the inner temperature of the flask at 90°–100° C. After the mixture had been completely dropped, into the flask, each 5 g of benzoyl peroxide was added three times (total 15 g) at a time interval of 2 hours to complete the polymerization, while keeping the inner temperature of the flask at 90°–100° C. Then the flask was cooled to an ambient temperature and 800 g of xylene was added. Thus, there was obtained a solution of a resin having a weight average molecular weight of 85,000 and $T_g$ of 10° C.

Using the solution of resin obtained above as a vehicle, an antifouling coating was prepared in the same manner as in Example 1 and immersion testing was conducted in the same manner as in Example 1.

COMPARATIVE EXAMPLE 2

The same apparatus as in Example 1 was used. After charging 1,200 g of xylene into the flask, a mixed solution consisting of 400 g of ethyl methacrylate, 400 g of ethyl acrylate, 1,100 g of butyl acrylate, 100 g of 2-hydroxyethyl methacrylate and 20 g benzoyl peroxide was added over a period of 6 hours, while keeping the inner temperature of the flask at 110°–120° C. After the mixture had been added completely, into the flask, each 2 g of benzoyl peroxide was added four times at a time intervals of one hour to complete the polymerization reaction, while keeping the inner temperature of the flask at 110°–120° C. Then, the flask was cooled to an ambient temperature and 800 g of xylene was added. Thus, there was obtained a solution of a resin having a weight average molecular weight of 15,000 and $T_g$ of $-10°$ C.

Using the solution of resin obtained above as a vehicle, an antifouling coating was prepared in the same manner as in Example 1 and immersion testing was conducted in the same manner as in Example 1.

COMPARATIVE EXAMPLE 3

A commercially available insoluble matrix type of antifouling paint using chlorinated rubber as vehicle was subjected to an immersion test in the same manner as in Examples mentioned above.

COMPARATIVE EXAMPLE 4

A commercially available soluble matrix type of antifouling paint using a high-polymeric organotin compound as vehicle was subjected to an immersion test in the same manner as in Examples mentioned above.

The results of the tests in Examples 1–5 and Comparative Examples 1–4 are summarized in Table 1.

TABLE 1

| | Duration of immersion (months) | Antifouling property | Smoothness | State of coating film |
|---|---|---|---|---|
| Example 1 | 6 | ◉ | ◉ | ◉ |
| | 12 | ◉ | ◉ | ◉ |
| Example 2 | 6 | ◉ | ◉ | ◉ |
| | 12 | ◉ | ◉ | ◉ |
| Example 3 | 6 | ◉ | ◉ | ◉ |
| | 12 | ◉ | ◉ | ◉ |
| Example 4 | 6 | ◉ | ◉ | ◉ |
| | 12 | ◉ | Δ | ◉ |
| Example 5 | 6 | ◉ | ◉ | ◉ |
| | 12 | ◉ | Δ | ◉ |
| Comparative Example 1 | 6 | ◉ | Δ | ◉ |
| | 12 | ◯ | Δ | ◉ |
| Comparative Example 2 | 6 | ◉ | ◉ | Crack |
| | 12 | ◉ | ◉ | Crack |
| Comparative Example 3 | 6 | Δ | x | |
| | 12 | x | x | |
| Comparative Example 4 | 6 | ◉ | ◉ | Crack |
| | 12 | ◉ | ◉ | Crack |

Antifouling property: : No attachment
: Amount of attachment 5–10%
Δ: Amount of attachment 11–50%
x: Amount of attachment more than 50%
Smoothness: : Comparable or superior to unimmersed coated film in smoothness
Δ: A little inferior to unimmersed coated film in surface smoothness
x: Inferior to unimmersed coated film in surface smoothness
State of coating film: : No cracking detected.
Crack: Cracking detected.

What is claimed is:

1. Antifouling coating composition comprising an antifouling agent dissolvable in sea water carried in a solution of sea water insoluble polymer of 100–80% by weight of at least one monomer represented by the formula:

wherein R is hydrogen or methyl group and R' is hydrogen or alkyl group having 1–12 carbon atoms and 0–20% by weight of a vinyl monomer copolymerizable therewith, said polymer having a glass transition temperature of $-30°$ C. to 0° C. and having a weight average molecular weight falling in the range of 20,000–200,000.

2. An antifouling coating composition comprising an antifouling agent dissolvable by sea water, carried in a solution of a sea water insoluble copolymer of not less than 80% by weight of at least one monomer represented by the formula:

wherein R is hydrogen or methyl group and R' is hydrogen or alkyl group having 1–12 carbon atoms, and up to 20% of another vinyl monomer copolymerizable therewith, said copolymer having a glass transition temperature of $-30°$ C. to 0° C. and having a weight average molecular weight falling in the range of 20,000–200,000.

3. An antifouling coating composition according to claim 1 wherein R′ in formula I

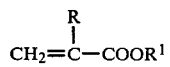

is hydrogen, a methyl group, an ethyl group or a butyl group.

4. An antifouling coating composition according to claim 2, wherein said vinyl monomer is styrene.

5. An antifouling coating composition according to claim 2 wherein R′ in formula (I) is hydrogen, a methyl group, an ethyl group or a butyl group.

6. An antifouling composition according to claim 5 wherein the monomer of formula (I) is ethyl acrylate, butyl acrylate, methyl methacrylate or ethyl methacrylate and the vinyl monomer copolymerizable therewith is 2-hydroxyethyl methacrylate or dimethylaminoethyl methacrylate.

7. An antifouling coating composition according to claim 2 wherein the copolymer is a copolymer of ethyl methacrylate, 2-hydroxyethyl methacrylate and ethyl acrylate.

8. An antifouling coating composition according to claim 2 wherein the copolymer is a copolymer of methyl methacrylate, dimethylaminoethyl methacrylate and ethylacrylate.

9. An antifouling coating composition according to claim 1 wherein the polymer is a copolymer of methyl methacrylate and butyl acrylate.

10. An antifouling coating composition according to claim 1 wherein the antifouling agent is at least one of cuprous oxide, copper rhodanate, zinc dimethyldithiocarbamate, tetramethylthiuram disulfide, triphenyltin hydroxide and tributyltin oxide.

* * * * *